United States Patent Office 3,436,356
Patented Apr. 1, 1969

3,436,356
METHOD OF PREPARING AN AGENT FOR PREVENTING CONTAMINATION OF AIR BY CARBON MONOXIDE
Tsutomu Kato, Hamamatsu-shi, Japan, assignor of one-third each to Daiichi Tanso Kogyo Kabushiki Kaisha, Fukuroi-shi, and to Tamachi Denki Kabushiki Kaisha, Minato-ku, Tokyo, Japan, both corporations of Japan
No Drawing. Filed July 14, 1965, Ser. No. 472,044
Claims priority, application Japan, July 22, 1964, 39/41,275; Apr. 7, 1965, 40/20,011
Int. Cl. B01j *11/32*
U.S. Cl. 252—450                                    2 Claims

ABSTRACT OF THE DISCLOSURE

A method of preparing oxidizing granular catalyst for preventing contamination of air by carbon monoxide which is characterized by press-molding a mixed fine powder of activated zeolite ore, pure manganese oxide and pure copper oxide.

---

This invention relates to a method of preparing an agent for preventing contamination of air, and more particularly to a method of preparing chemical agents for preventing contamination of air due to CO gas contained in the exhaust gas from automobile engines by converting it into harmless $CO_2$ gas.

In recent years, from the standpoint of environment sanitation, the problem of preventing contamination of air in large cities becomes very serious. Reasonable counter measures have already been taken for physical or visible contamination of the atmosphere, by smoke, dust or smog. Unfortunately, any basic and positive counter-measure has not yet been taken for the contamination of atmosphere due to the chemical or invisible cause, that is distribution of poison gas in the air such as carbon monoxide, sulfur dioxide, nitrogen oxide, lead compounds, aldehydes or the like. These poison gases are contained in the exhaust gas from automobile engines, and since a great many motor cars are running in almost all places of large cities in day and night, the air in every place of large cities is always contaminated by such exhaust gas, greatly spoiling the health of the inhabitants. Thus urgent counter-measure therefore is desired.

It is impossible to sense the presence of CO gas which is ordinarily contained in the exhaust gas in a relatively large amount, that is 3.4% by volume on the average, owing to its colorless and odorless properties. Those who aspirate the air containing CO gas at a concentration of more than 20 p.p.m. will have an impaired heart and blood circulating system, accompanied by toxicosis of headache, giddiness and nausea, and cause death of the patient in the worst case. While research has been made to remove CO gas from the exhaust gas, no effective adsorbent or preferable catalyst suitable for converting CO in the exhaust gas into harmless $CO_2$ gas by oxidation has been developed. At present a device is exclusively used wherein the exhaust gas is passed to flow through an afterburner which functions to burn CO by ignition. However such an after-burner is not widely used because of its complicated construction, high cost of fabrication and inconvenience in handling.

It is therefore an object of this invention to provide a simple device which functions to readily convert CO gas contained in the exhaust gas from automobile engine and the like into harmless $CO_2$ gas, so as to effectively prevent contamination of the atmosphere by the exhaust gas.

A further object of this invention is to provide an economical catalyst which has a large activity even at low temperatures and can be used over long period for converting CO gas contained in the exhaust gas into $CO_2$ gas by catalytic oxidation.

Still another object of this invention is to provide an effective catalytic filler which can be used in the CO protecting mask utilized in coal mines or in the field of fires in addition to remove CO gas from the exhaust gas of engines.

The above objects may be attained in accordance with the present invention by using a catalyst consisting of granular natural zeolite containing some kinds of effective inorganic compounds. The features of the invention which are believed novel are set forth with particularity in the appended claims. The invention itself together with further objects and advantages thereof, may best be understood from the following detailed description.

Natural zeolite ores abundantly deposited under the ground near the surface at several places in Japan contain therein some amount of pure zeolite, and these ores were found to have superior adsoptive power due to a special molecular structure of the zeolite. As a result natural zeolite ores have been utilized as a deodorizing agent as well as a soil reforming agent. At first I have tried to adsorb CO gas contained in the exhaust gas by the natural zeolite ore, but I have found that the natural zeolite ore didn't have any appreciable adsorptive power for CO gas.

Then I came to conceive the idea of utilizing the natural zeolite ore as a catalyst for oxidizing CO gas, and as a result of extensive researches I have found that the natural zeolite itself is not yet effective as the catalyst, but the object can be attained by incorporating certain kinds of inorganic compounds to the natural zeolite. More particularly, the novel agent for preventing contamination of air is prepared by the following process. The natural zeolite ore is at first crushed to have a suitable grain size, dipped in a diluted hydrochloric acid and is then dried at a temperature in a range of from 300° C. to 400° C. to improve its activity. Further, a promotor consisting of one or more of inorganic copper compounds such as copper sulfate and copper chloride was incorporated into a mixture of one or more compounds selected from a group consisting of inorganic manganese compounds such as manganese sulfate and manganese chloride, inorganic nickel compounds such as nickel sulfate and nickel chloride and potassium iodide, and then the mixture is dissolved in strong ammonia water. The above described activated zeolite granules are dipped in said solution, and then taken out and calcined at a temperature of from 600 to 700° C.

The catalytic action of this catalyst for oxidizing CO gas is very strong by the multiple effect of the porosity and activity of the zeolite molecule and the catalytic power of the inorganic substances incorporated. Thus, even at a relatively low temperature of from 200 to 300° C. almost all CO gas contained in the exhaust gas are oxidized into $CO_2$ gas by air mixed in small quantity in the exhaust gas. Moreover, the useful life of this catalytic agent is long enough to meet practical requirements.

One example will be described hereunder to discuss in detail the preventing agent.

The natural zeolite ore produced from Ten-ei, Fukushima Prefecture of Japan contains about 10% of pure zeolite. It has a very low hardness and is very brittle and fragile. The ore is roughly crushed, and particles having a grain size of 4 to 10 meshes are collected by sieving, the yield being about 50%. The remaining fine powder is utilized as an ordinary deodorizing agent or soil reforming agent after drying and pulverizing. The collected natural zeolite granules after sieving are dipped in diluted hydrochloric acid having a concentration of 6%, for about 3 hours, removed from the acid, washed by water, and finally dried at a temperature of from 300 to 400° C. to perfectly drive off the hydrochloric acid.

On the other hand, 1 kg. of manganese sulfate is dissolved in 2 liters of strong ammonia water of the concentration of about 28%, and 0.5 kg. of copper sulfate acting as a promotor is dissolved moreover in said solution. The natural zeolite granules treated as above described are immersed in said solution, and after standing for 24 hours the granules are removed from the solution and dried. Then the granules are calcined at a temperature of about 700° C. for about one hour. As the natural zeolite ore is very brittle, if granules thereof prepared by crushing only are packed in a CO gas removing box mounted on motor cars, they would be gradually disintegrated by vibration. But granules dipped in said solution of catalyst and calcined in the manner discribed above are rigid so that they have but little tendency to disintegrate during use. The operating temperature of this preventing agent is higher than 200° C., and at temperatures below 200° C. the catalytic activity of the agent decreases rapidly.

I have made following purifying tests for the exhaust gas from an automobile engine. A CO gas removing box of the dimensions of 320 mm. x 470 mm. x 60 mm. charged with this catalyst granules was connected to the outlet of the exhaust of 4 cylinders automobile test engine having a displacement of 1200 cc., and CO gas content in the exhaust gas discharged from the CO gas removing box was measured while the test engine was maintained in the actual running condition. There is one small compressor beside the box, and a small amount of air is compressed into the box continuously. In order to allow to approach to the actual running condition the engine was stopped for one hour after each operation corresponding to 500 km. running. The average content of CO gas of the exhaust gas from the engine was 3.4%, but no appreciable CO gas was measured in the gas leaved from the removing box until a running distance of approximately 2000 km. was reached. But the CO gas content was increased to about 0.5% after a running distance of 4000 km., and to about 1% after 6000 km. The present general object of preventing contamination of the atmosphere is of the order of less than 2% of that, but in this invention this object was reduced to less than 1% from the viewpoint of safe.

In these tests the temperature of the CO gas removing box was increased from room temperature to about 200° C. after about half an hour from starting, by the high temperature of the exhaust gas, and thereafter reached a steady state of approximately 300° C. It was found that the weight of the catalyst granules during or after the running test did not increase. This means that the CO gas contained in the exhaust gas is not adsorbed by the granules but is catalytically converted into $CO_2$ by oxidation. However it is considered that the CO gas is momentarily attracted to zeolite and catalytically oxidized therein, and then freed from the granule. Very slight increase in the weight of catalyst granules is believed to be caused by adsorption of heavy gases other than CO gas and accumulation of smoke and dust.

In the above example same results were obtained when manganese chloride, nickel sulfate, nickel chloride or potassium iodide was incorporated into the catalyst granules in lieu of manganese sulfate.

The average annual running distance of motor cars is estimated to be about 10,000 km. for an individual owner driver's car, about 50,000 km. for a taxi car and about 20,000 km. in an average for all types of motor cars. Accordingly it is desirable to make the operating life of the catalyst correspond to about 20,000 km. running distance, in other words about one year life in order to avoid frequent renewal.

I have successfully investigated to improve the above described catalyst granules in order to meet the above requirement. In accordance with this additional invention, the improved catalyst granules are prepared in the following manner. At first, natural zeolite activated by diluted hydrochloric acid is pulverized into fine powder. To this fine powder of natural zeolite is mixed about an equal weight of a mixture consisting of a fine powder of pure manganese oxide as a catalyst and that of pure copper oxide as the promotor. The mixture is then pressmolded under a high pressure into granules. The proportion of the pure manganese oxide and the pure copper oxide is from 6 to 7 parts, by weight, of the former and from 4 to 3 parts, by weight, of the latter. It is advantageous to prepare the pure manganese oxide by causing simultaneous oxidation and precipitation of an acidic solution of manganese salts and then collecting the precipitated manganese oxide. It is also desirable to prepare the pure copper oxide by precipitating copper hydroxide from an alkaline solution of copper salts and then dehydrating the copper hydroxide.

In the early stage of development, there was a tendency that the inorganic materials had adhered only to the surface of the granules of natural zeolite when they are immersed in an inorganic solution so that the inorganic substances did not penetrate into the core portion of the granules. And also the mechanical strength of the catalyst granules obtained is not sufficient to withstand vibration to which they are subjected during operation of motor cars over a long period, so that they are gradually disintegrated. This invention contemplates to mechanically mix together a fine powder of activated natural zeolite and fine powders of a catalyst material and a promoter, and to mold the mixture under a high pressure into granules. I have also investigated about the inorganic catalyst material and promoter which are to be incorporated, and found that copper oxide of very high purity and in the form of fine powder not only exhibits most strong activity but also the function as the binder. As the specific gravity of natural zeolite powder is low, the volume proportion of the powder thereof is higher than that of the inorganic catalyst and promotor. Consequently the mixture of these materials can be molded into rigid granules under a sufficiently high pressure without utilizing any binder.

An embodiment will be illustrated hereunder to describe in detail a method of preparing the improved protecting agent. Manganese oxide, which is the essential catalyst material, was prepared by dissolving 500 grams of common manganese sulfate, $MnSO_4 \cdot 4H_2O$, in 800 cc. of water maintained at the temperature of 40° C. The solubility thereof is maximum at 40° C. Upon cooling this solution, the supersaturated parts of the salt became deposited thus leaving a mother liquor of saturated solution. Then 1200 g. of 98% concentrated sulfuric acid was gradually incorporated into the clear saturated solution while it was maintained at a temperature between 50° C. and 60° C. to deposit very fine precipitate of pure anhydrous manganese sulfate. 210 g. of a powder of potassium permanganate was gradually incorporated, while agitating, into the solution containing said precipitate while maintaining the solution at a temperature of 55° C. to cause the following reaction.

$$5MnSO_4 + 4KMnO_4 + 3H_2O \rightarrow 9MnO_2 + 2K_2SO_4 + 3H_2SO_4 + \tfrac{1}{2}O_2 \quad (1)$$

During the reaction, care was taken to maintain the temperature within a range of from 50° to 60° C. By this reaction a small amount of oxygen was evolved. After completion of incorporation of potassium permanganate the agitation of the reaction mixture was continued for a while, and then the reaction mixture was cooled down. The precipitate of manganese oxide was collected by decantation, washed with water until the liquid became neutral, filtered and dried to obtain the pure powdery main catalyst material.

The copper oxide serving as the promoter was prepared by dissolving 400 g. of common copper sulfate, $CuSO_4 \cdot 5H_2O$, in 2 l. of water and the solution was heated to 50° C. To this heated solution was gradually added 1.4 l. of 10% aqueous solution of caustic soda maintained at 50° C. to form blue black colored fine precipitate of copper hydroxide $Cu(OH)_2$. After cooling the liquid containing said precipitate, the precipitate was collected by decantation, washed with water until the liquid became neutral, separated by filtering, dried and calcined to produce pure promotor in the form of fine powder.

Now the before-mentioned natural zeolite ore produced from Ten-ei was crushed to about 4 mesh size, immersed in 6% diluent hydrochloric acid for 24 hours, dried and then calcined at a temperature between 600° C. and 800° C. This activated substance was further pulverized into fine powder of about 100 mesh to form an active carrier.

This active carrier was uniformly mixed with a substantially equal quantity of mixture consisting of 6–7 parts, by weight, of the above mentioned main catalyst material and 4–3 parts, by weight, of the promotor, and then molded into granules or tablets having a diameter of about 5 mm. under a pressure of 6000 kilograms per square centimeter so as to obtain an agent for preventing contamination of the atmospheric air by CO gas.

8 l. of this agent was charged in the same CO gas removing box as before described, connected to a four cylinder motor car engine of 1200 cc. displacement capacity, and subjected to the same running tests as before. After a corresponding running of 5,000 km. the CO gas content of the gas discharged from the box was 0.15%, this content was increased to 0.35% after running of 10,000 km. and to about 0.7% after running 20,000 km. After corresponding running of 20,000 km. the granules were not disintegrated in any appreciable amount.

The results of experiment have showed that this re-improved catalyst has sufficiently strong activity of oxidizing CO gas even at normal temperature, so that once charged in a CO removing apparatus the novel catalyst commences to remove CO gas immediately after starting the engine without awaiting temperature rise, thus rendering more perfect the action of preventing the air from contamination.

In addition to clean the exhaust gas from automobile engines, this agent is also suitable to be packed in household air cleaners to remove CO gas contained in the burned gas exhausted from petroleum oil stoves or in car room air which is contaminated by the leaked exhaust gas from its motor car engine. Further the preventing agent of this invention can be advantageously used in CO gas protecting masks utilized in coal mines and fields of fires. Prior art CO gas protecting masks are required to have an effective operating time of at least 30 minutes, but this operating time is too short in view of recent coal mine or fire disasters, so that generally there is an intense desire to extend this operating time. I have found that the novel preventing agent of this invention can operate effectively more than one hour when packed in such masks.

To increase the effectiveness of the purifying box for the exhaust gas from automobile engine, it is preferable to charge iron wool to remove smoke and dust before the granules, and active charcoal which acts to adsorb poison components other than CO gas after or before the novel catalyst granules.

While the invention has been described with reference to preferred embodiments thereof, it will be understood that various changes and modifications may be made therein without departing from the spirit and scope of the invention as defined in the appended claims. It is intended, therefore, that all matters contained in the following description is to be interpreted as illustrative only and not as limitative of the invention.

What is claimed is:

1. A method of preparing an oxidizing catalyst for preventing contamination of air by carbon monoxide which comprises the steps of, uniformly mingling one weight part of fine powder of natural zeolite ore, which has been activated by diluted hydrochloric acid, with one weight part of a mixture consisting of from 6 to 7 parts by weight of fine powder of pure manganese oxide and from 4 to 3 parts by weight of fine powder of pure copper oxide, and press-molding the mingled substance to granules of from 3 to 7 mm. size under the pressure of about 6000 kg./cm².

2. An oxidizing catalyst for preventing contamination of air by carbon monoxide, said oxidizing catalyst comprising a press molded product consisting of a uniform mixture of almost equal quantities of a fine powder of natural zeolite ore activated by diluted hydrochloric acid and of a mixture of from 6 to 7 parts, by weight, of a fine powder of pure manganese oxide and from 4 to 3 parts, by weight, of a fine powder of pure copper oxide.

References Cited

UNITED STATES PATENTS

| 2,980,494 | 4/1961 | Jenkins et al. | 23—4 |
| 3,130,006 | 4/1964 | Rabo et al. | 252—455 X |
| 3,177,152 | 4/1965 | Kearby | 252—455 |
| 3,181,928 | 5/1965 | Frilette et al. | 23—2.2 |
| 3,185,540 | 5/1965 | Breck et al. | 23—2 |

DANIEL E. WYMAN, *Primary Examiner.*

C. F. BEER, *Assistant Examiner.*

U.S. Cl. X.R.

252—455; 23—2